US008943336B2

(12) United States Patent
Shah et al.

(10) Patent No.: US 8,943,336 B2
(45) Date of Patent: Jan. 27, 2015

(54) METHOD AND APPARATUS FOR CONFIGURABLE THERMAL MANAGEMENT

(75) Inventors: Ketan R. Shah, Olympia, WA (US); Tawfik M. Rahal-Arabi, Tigard, OR (US); Eric Distefano, Livermore, CA (US); James G. Hermerding, II, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 13/175,081

(22) Filed: Jul. 1, 2011

(65) Prior Publication Data

US 2013/0007440 A1      Jan. 3, 2013

(51) Int. Cl.
    G06F 1/00     (2006.01)
    G06F 1/26     (2006.01)
    G06F 1/20     (2006.01)

(52) U.S. Cl.
    CPC ..................... *G06F 1/206* (2013.01)
    USPC .......................................... 713/300; 713/320

(58) Field of Classification Search
    CPC ...................................................... G06F 1/206
    USPC ................... 713/1, 2, 100, 300, 320
    See application file for complete search history.

(56) References Cited

U.S. PATENT DOCUMENTS

| 6,792,550 | B2 * | 9/2004 | Osecky et al. ............... 713/300 |
| 6,908,227 | B2 | 6/2005 | Rusu et al. |
| 6,928,565 | B2 * | 8/2005 | Watts et al. .................. 713/322 |
| 7,039,799 | B2 * | 5/2006 | Smith et al. .................. 713/100 |
| 7,360,102 | B2 | 4/2008 | Inoue |
| 7,464,277 | B2 * | 12/2008 | Prosperi et al. .............. 713/320 |
| 7,689,839 | B2 * | 3/2010 | Uguen et al. ................. 713/300 |
| 7,932,639 | B2 * | 4/2011 | Ma et al. ......................... 307/75 |
| 2002/0162033 | A1 * | 10/2002 | Maxwell et al. ............. 713/300 |
| 2005/0091548 | A1 * | 4/2005 | George et al. ................ 713/320 |
| 2007/0168625 | A1 | 7/2007 | Cornwell et al. |
| 2008/0125915 | A1 * | 5/2008 | Berenbaum et al. ......... 700/278 |
| 2009/0228893 | A1 | 9/2009 | Behrendt et al. |
| 2011/0225274 | A1 * | 9/2011 | Dvorkin et al. .............. 709/222 |

OTHER PUBLICATIONS

International Search Report and Written Opinion received for PCT Patent Application No. PCT/US2012/045162, mailed Dec. 20, 2012, 11 pages.

\* cited by examiner

*Primary Examiner* — Mark Connolly
(74) *Attorney, Agent, or Firm* — Kacvinsky Daisak Bluni PLLC

(57) ABSTRACT

Embodiments of an apparatus, system and method are described for configurable processor thermal management. An apparatus may comprise, for example, a processor arranged to operate in a plurality of thermal modes comprising a thermal limit down mode, a normal thermal limit mode and a thermal limit up mode, and thermal management logic operative to select a thermal mode based on one or more properties of the apparatus. Other embodiments are described and claimed.

32 Claims, 5 Drawing Sheets

METHOD AND APPARATUS FOR CONFIGURABLE THERMAL MANAGEMENT

BACKGROUND

The performance of modern computing systems has increased rapidly in recent years. One particular area in which performance has evolved is processor technology. Additionally, form factors and cooling requirements for computing devices have also evolved. The increase in processing power along with the ever-changing shape and size of computing devices has also resulted, in many instances, in a broad range of cooling requirements. As processing power continues to increase and other parameters continue to change, reductions in power consumption and heat generation become important considerations. As a result, it is desirable to adapt processors and other silicon, when possible, to optimize performance and reduce heat generation. Consequently, there exists a substantial need for techniques including configurable thermal management.

DETAILED DESCRIPTION

Figure 1A:
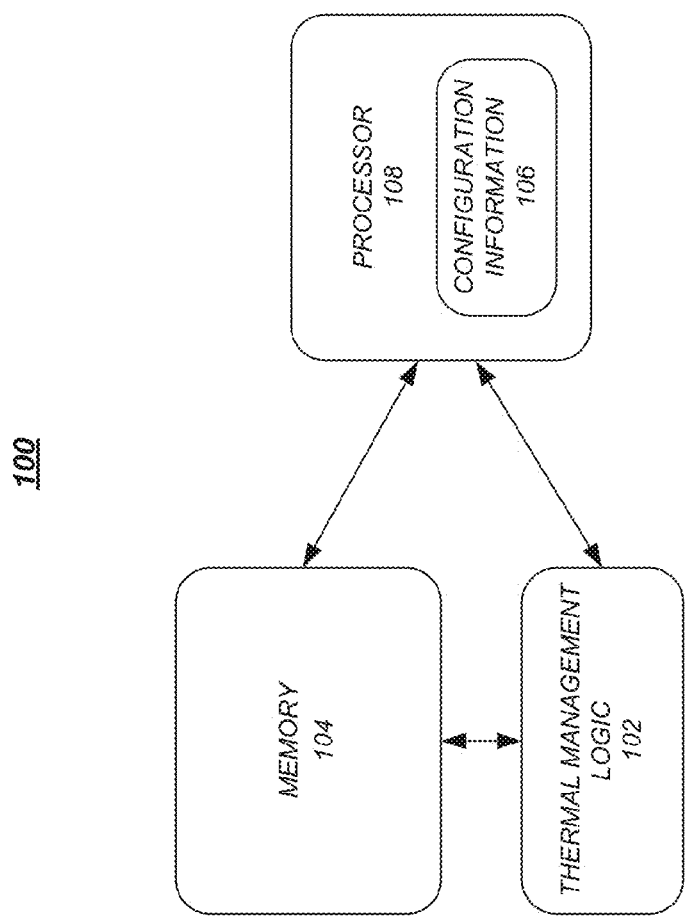
FIG. 1A illustrates one embodiment of an apparatus.

The embodiments are generally directed to techniques designed to allow for configurable thermal management. Various embodiments provide techniques that include thermal management logic operative to select a thermal mode for a processor based on one or more properties of an apparatus or the processor. For example, in some embodiments, a processor may be arranged to operate in a plurality of thermal modes comprising at least a first mode having a first thermal limit and a second mode having a second thermal limit different than the first thermal limit. In various embodiments, the plurality of modes may comprise a thermal limit down mode, a normal thermal limit mode and a thermal limit up mode. Other embodiments are described and claimed.

Processors and other silicon components are generally tested and fixed at a particular maximum temperature limit (Tjmax). Platform thermal capability is a design choice for OEMs as it impacts, size, weight, audible noise, and bill of materials (BOM) cost. The specified Tjmax for the processor therefore may have significant impact on the platform thermal design. Some processors are sold with only a single set Tjmax that may limit platform design choices. For example, running a higher power processor in an environment of lesser cooling capability than that which can cool the specified Tjmax may cause thermal control to reduce performance to what is really an unknown capability level that varies across products.

A configurable Tjmax, according to one embodiment, may allow the OEM to configure the Tjmax of the processor to one of several values. This configuration can be performed either statically at initialization or dynamically, "on-the-fly". The implication of this configuration may be that a certain performance is guaranteed by a known base frequency and the configurable Tjmax is specified for each of the supported base frequencies. In various embodiments, Tjmax configurability may provide an OEM with the capability to ensure that maximum power dissipation is known while still delivering adequate performance within set thermal boundaries.

In various embodiments, platforms and thermal solutions are required to be designed to the set Tjmax limit to ensure reliabile and predictable performance. In some embodiments, this lack of configurability may prevent innovative platform designs as designers and OEMs may be constrained to a larger-size platform/form factor than desired. Similarly, the lack of configurability may also result in less than optimal performance in some embodiments because the boundary conditions for the thermal environment may have margins (e.g. actual Tj lower than the fixed limit Tjmax) that could be converted into power or performance gains if thermal configurability were available. In various embodiments, configurable thermal management or configurable Tjmax for processors and other silicon may allow for flexibility of form factor design and thermal solutions while maximizing performance. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1A illustrates one embodiment of an apparatus. FIG. 1A illustrates a block diagram of an apparatus 100. Apparatus 100 may comprise a computing system in some embodiments. As shown in FIG. 1A, apparatus 100 comprises multiple elements, such as thermal management logic 102, memory 104, configuration information 106 and processor 108. The embodiments, however, are not limited to the elements or the configuration shown in this figure.

In various embodiments, processor 108 may comprise a central processing unit comprising one or more processor cores. The processor 108 may include any type of processing unit, such as, for example, CPU, multi-processing unit, a reduced instruction set computer (RISC), a processor that have a pipeline, a complex instruction set computer (CISC), digital signal processor (DSP), and so forth.

In various embodiments, memory 104 may comprise any suitable type of memory unit, memory device, memory article, memory medium, storage device, storage article, storage medium, register and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

In various embodiments, thermal management logic 102 may comprise a software driver or application to mange thermal configurability for computing system 100 or processor 108. In some embodiments, thermal management logic 102 may comprise a software driver running under an operating system that controls entry into and management of a specific thermal mode, such as a thermal limit down mode, a normal thermal limit mode or a thermal limit up mode for example. While embodiments described hereinafter may refer to a thermal limit down mode, a normal thermal limit mode or a thermal limit up, it should be understood than the embodiments are not limited in this context. For example, a first mode having a first thermal limit, a second mode having a second thermal limit and so on could be used and still fall within the described embodiments. In various embodiments, the thermal limit down mode may comprise a first mode having a first thermal limit, the thermal limit up mode may comprise a second mode having a second thermal limit and the normal thermal limit mode may comprise a third mode having a third thermal limit, wherein each of the thermal limits are different. Other embodiments are described and claimed.

The different thermal modes may provide for different maximum temperature limits or Tjmax limits in some embodiments. It should be understood that while thermal management logic 102 is shown as a separate component in computing system 100, it may be included in memory 104, as part of or embedded within processor 108 or in any other location or configuration and still fall within the described embodiments. Similarly, while a limited number and type of thermal modes are described for purposes of illustration, it should be understand than any number, type, arrangement or configuration of thermal modes could be used and still fall within the described embodiments. Other embodiments are described and claimed.

Figure 2:
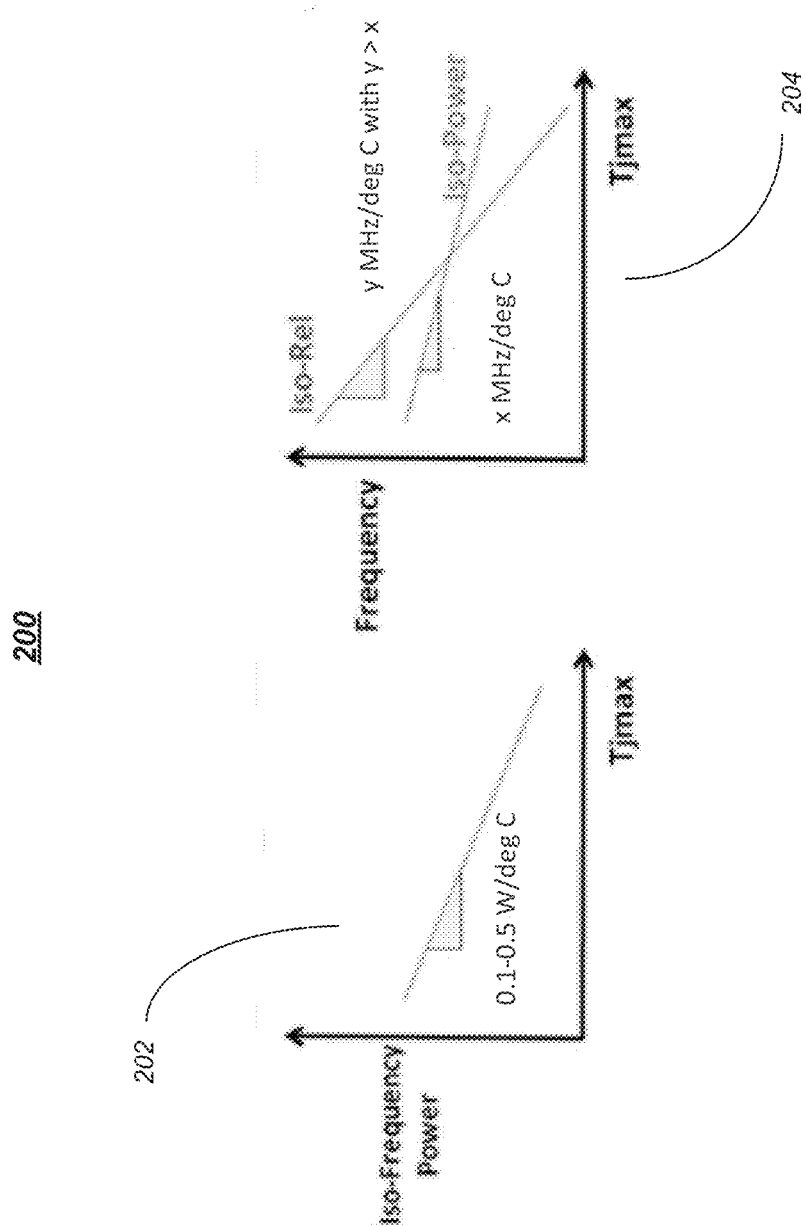
FIG. 2 illustrates one embodiment of a graph.

As illustrated by the graphs 202 and 204 of FIG. 2, varying the Tjmax of a processor may have an effect on power and frequency for the processor. For example, a lower Tjmax may reduce power consumption for the processor by reducing leakage current. A lower Tjmax may also improve reliability for mechanisms such as electro-migration and gate-oxide reliability. This in combination with the associated power reduction may allow for higher frequency operation of a processor at iso-power. For example, in various embodiments, a typical iso-reliability curve may have several mV/degree C. sensitivity. In some embodiments, every 1 degree C. reduction in Tj allows for a several mV increase in voltage. This frequency and power sensitivity to temperature may allow for new usage scenarios for a processor when used in combination with a configurable Tjmax feature.

Returning to FIG. 1A, in some embodiments, processor 108, instead of having only one set of fixed frequencies and Tjmax values, may include additional configurable states with both lower or higher Tjmax and corresponding frequencies. For example, processor 108 may be arranged to operate in a plurality of thermal modes comprising a thermal limit down mode, a normal thermal limit mode and a thermal limit up mode. In some embodiments, thermal management logic 102 may be operative to select a thermal mode based on one or more properties of the apparatus. For example, the various thermal configurations or modes may be stored as configuration information 106 and may be accessible to hardware and software through one or more interfaces and can be chosen either at boot or dynamically during operation.

Previous processors having a matching stock keeping unit (SKU) included a fixed Tjmax. In various embodiments, this Tjmax was defined based on baseline platform assumptions that are based on a reference platform or assessment of customer capabilities and platform needs. In some embodiments, when a different Tjmax is required, either a new SKU is added or it is simply not supported and system performance may suffer as a result. Different Tjmax values may be implemented using previous processors, however, the corresponding power and frequency benefits are not known and corresponding set-points are not defined.

In various embodiments, the additional two configurable points with Tjmax up and down (e.g. thermal limit up mode and thermal limit down mode) may be tested a priori and provided as alternative design points for customer platform optimization from a cost and performance point of view. In various embodiments, each of the plurality of thermal modes comprises one or more defined thermal, power and performance characteristics. For example, each thermal mode may include a different Tjmax, operating frequency, power requirement, estimated heat generation or any other suitable parameter or property. In some embodiments, each of the plurality of thermal modes comprises different operating frequencies and power consumption levels that are pre-determined and are known to a system designer or OEM. With knowledge of the properties of the different thermal modes for a processor, a system designer or OEM may design a system that fully utilizes the capabilities of a processor and that conforms to a desired design without sacrificing performance or be subject to thermal constraints associated with a fixed Tjmax processor.

In some embodiments, the addition of the configurable Tjmax set points may allow designers and OEMs to alter the required temperature (Tjmax), processor power and processor performance by selecting Tjmax design points that better suit a system design. The flexibility of optimizing processor performance in view of a platform design for a given SKU of processors may also enable designers and OEMs to target the right platform for end-users. For example, designers may be able to optimize cooling solution cost, performance and acoustics by selecting an appropriate Tjmax or thermal limit mode.

In some embodiments, processor 108 may be arranged to operate in one of a thermal limit down mode, a normal thermal limit mode or a thermal limit up mode. While a limited number and type of thermal modes are described for purposes of illustration, it should be understand than any number, type, arrangement or configuration of thermal modes could be used and still fall within the described embodiments.

The thermal limit down mode may comprise a thermal mode having a lower maximum temperature limit or Tjmax than the normal thermal limit mode and the thermal limit up mode in some embodiments. In various embodiments, the normal thermal limit mode may comprise a thermal mode having a higher temperature limit or Tjmax than the thermal limit down mode and a lower temperature limit than the thermal limit up mode. In some embodiments, the thermal limit up mode may comprise a thermal mode having a higher temperature limit or Tjmax than the thermal limit down mode the normal thermal limit mode. Other embodiments are described and claimed.

In various embodiments, information or settings for the various thermal modes may be stored as configuration information 106. For example, the configuration information may comprise or include a maximum temperature limit or an operating frequency for each thermal mode. In some embodiments, the configuration information 106 may be included with, stored by or otherwise accessible by processor 108 through one or more interfaces. For example, the one or more interfaces may comprise one or more of a memory-mapped input/output (MMIO) or a platform environment control interface (PECI).

In some embodiments, the thermal management logic 102 may be operative to select a thermal mode during a boot sequence of the processor or during operation of the processor. For example, the selection may be either static or dynamic. In various embodiments, the dynamic usage of the configurable Tjmax can be enabled by using processor registers (e.g. MSR=Model Specific Registers) that are accessible to software and hardware through the MMIO and PECI interfaces.

In various embodiments, the system may include one or more sensors operative to sense a temperature of the processor 108. For example, in some embodiments, the processor may include an embedded sensor that sense and report the temperature of the processor. Other embodiments are described and claimed.

Figure 1B:
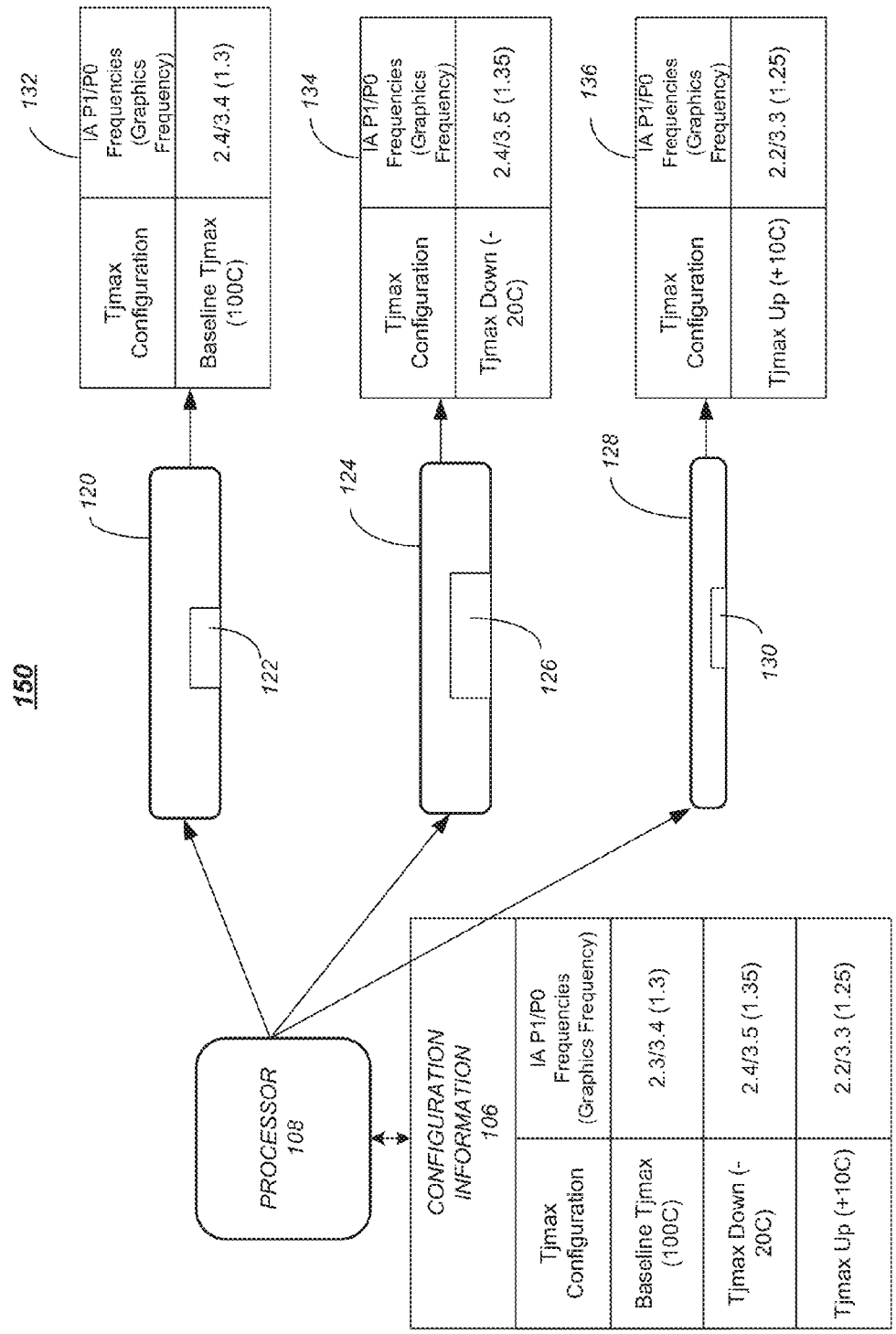
FIG. 1B illustrates one embodiment of computing platforms.

FIG. 1B illustrates three example usage scenarios that include a configurable Tjmax as described above with reference to FIG. 1A. In various embodiments, like elements are numbered throughout. A limited number and type of platforms are described in FIG. 1B for purposes of illustration and not limitation. As shown, the systems 150 of FIG. 1B include, but are not limited to a processor 108, configuration information 106, platforms or systems 120, 124 and 128 and cooling components 122, 126 and 130. Processor 108 and the corresponding configuration information 106 may be available to each of systems 120, 124 and 128 in various embodiments. In this manner, a designer of each of these systems may be able to select a thermal configuration for the system based on any number of parameters or factors. Cooling components 124, 126 and 128 may comprise one or more of a fan, blower, heat synch, heat exchanger, heat pipe or any suitable combination of cooling components. The embodiments are not limited to the number or type of components shown.

In various embodiments, each of the systems 120, 124 and 128 may comprise a computing device. Examples of computing devices may comprise, or be implemented as, any type of wireless device, mobile station, or portable computing device such as a laptop computer, ultra-laptop computer, netbook computer, notebook computer, tablet computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

In some embodiments, system 120 may comprise a baseline system having typical cooling components 122. In this situation, a baseline Tjmax (e.g. normal thermal limit mode) may be selected and the resulting thermal configuration and frequencies are shown at 132. By way of contrast, system 124 may comprise a system having a same thickness as system 120 but may include larger cooling components 126. In various embodiments, the addition of the larger cooling components may allow for the selection of a lower Tjmax value (e.g. thermal limit down mode) and the resulting thermal and frequency information is shown at 134. System 128, in some embodiments, may comprise a thin system having smaller or thinner cooling components 130. In this example, a higher Tjmax value (e.g. thermal limit up mode) may be selected and the resulting thermal configuration and frequency information is shown at 136. Other embodiments are described and claimed.

One skilled in the art will understand than any number of factors could result in the selection of a desired thermal configuration for a processor having a configurable Tjmax. Below are several example usage scenarios that a configurable Tjmax feature may allow for. The embodiments are not limited in this context.

In one embodiments, a computing system may not be thermally constrained by the processor thermal solution but may be constrained by other limits such as a surface or skin temperature. In this example, embodiments, the system may employ an advanced thermal technology that allows for a lower Tjmax than the baseline assumption. In this situation, a lower Tjmax configuration may be selected which may result in power savings and an increase operating frequency and improved performance.

Computing systems may be thermally constrained based on form factor optimization (e.g. minimization of thickness) in some embodiments. In these embodiments, the system may be limited by the processor thermal specifications and a higher Tjmax configuration may be selected such that the system can be designed to have a thinner form factor or utilize a cheaper thermal solution.

In various embodiments, thermal solutions for a computing system may be designed to work in a worst-case environment, thermal solution resistance extremes and high-power workloads such that under typical conditions and workloads, the processor may operate under a normal temperature limit. In this situation, a lower Tjmax configuration may be dynamically selected to improve performance during the typical operation modes. Other embodiments are described and claimed.

While certain embodiments are described in terms of components, modules, logic, software or threads, it should be understood that any number of components, modules, threads or arrangement of logic and any number of thermal configurations or modes can be used and still fall within the described embodiments. Furthermore, it should also be understood that the logic flows described herein depict only examples of logic flows and that different numbers, orders and/or arrangements of the operations described in the logic flows could be implemented and still fall within the described embodiments.

Figure 3:
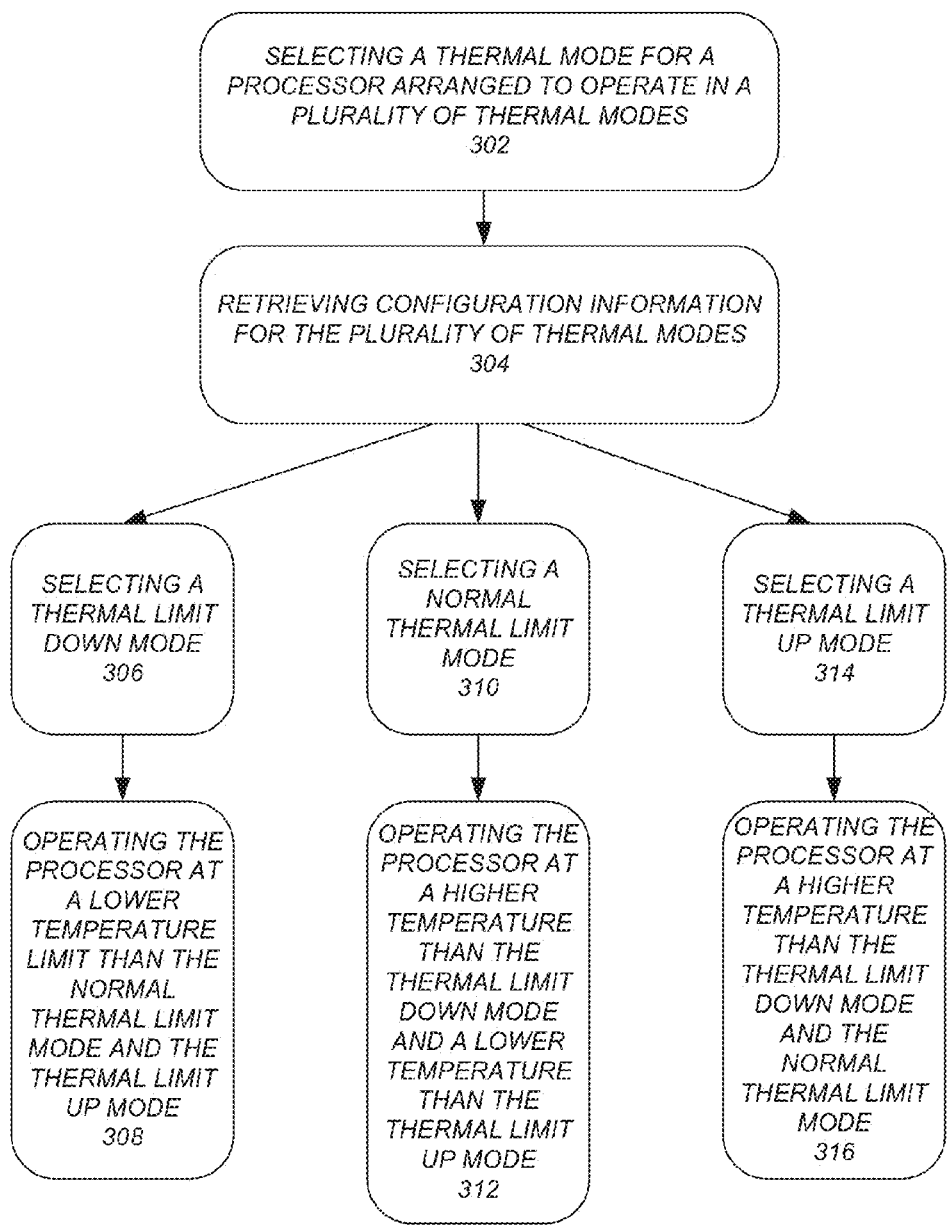
FIG. 3 illustrates one embodiment of a logic diagram.

FIG. 3 illustrates one embodiment of a logic flow 300. In various embodiments, the logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or computer-readable instructions to be executed by a logic device (e.g., computer, processor). In some embodiments, the logic or instructions may be embodied on a non-transitory computer-readable storage medium to be executed by a computer processor. The embodiments are not limited in this context.

In one embodiment, a thermal mode for a processor arranged to operate in a plurality of thermal modes may be selected 302. For example, thermal management logic 102 may select a thermal mode for processor 108 wherein the thermal mode includes a thermal limit down mode, a normal thermal limit mode or a thermal limit up mode. At 304, configuration information for one or more of the plurality of thermal modes may be retrieved. In some embodiments, the processor stores the configuration information internally or the configuration information may be embedded on the processor or as part of the processor. In other embodiments, the processor 108 or thermal management logic 102 may retrieve configuration information 106 from memory 104 in some embodiments. In various embodiments, the configuration information may comprise a maximum temperature limit or operating frequency for each thermal mode.

At 306, 310 and 314 respectively, in various embodiments, one of the plurality of thermal modes may be selected. At 306, for example, a thermal limit down mode may be selected and at 308 a processor may be operated at a lower temperature limit than the temperature limit for the normal thermal limit mode and the thermal limit up mode. In some embodiments, at 310, a normal thermal limit mode may be selected and at 312 a processor may be operated at a higher temperature than the thermal limit down mode and a lower temperature than the thermal limit up mode. At 314, in various embodiments, a thermal limit up mode may be select and at 316 a processor may be operated at a higher temperature limit than the temperature limit for the thermal limit down mode and the normal thermal limit mode.

In various embodiments, the configuration information is accessible through and my be retrieved via one or more interfaces such as one or more of a memory-mapped input/output (MMIO) or a platform environment control interface (PECI). In some embodiments, a thermal mode may be selected during a boot sequence of the processor or during operation of the processor. Other embodiments are described and claimed.

Figure 4:
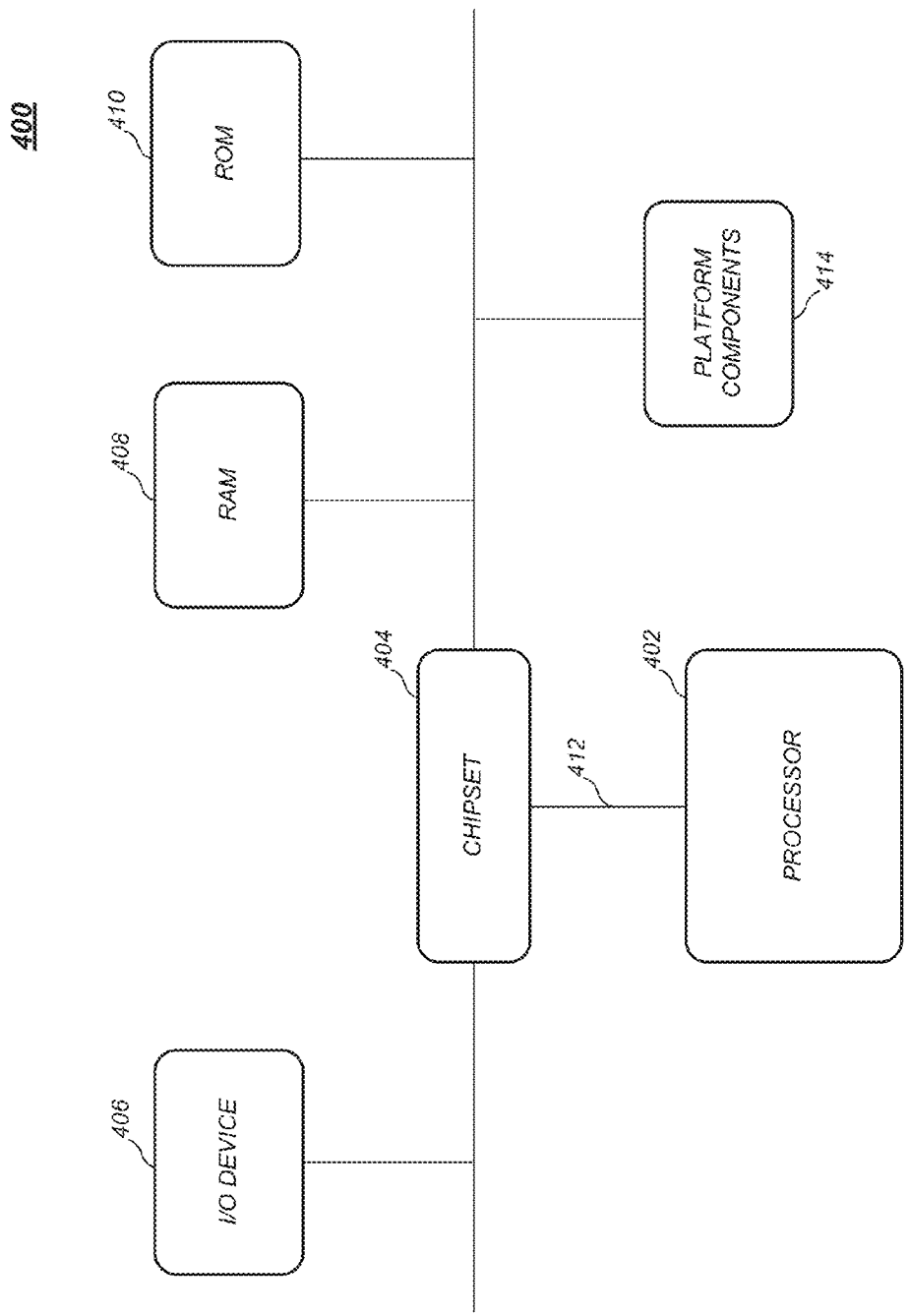
FIG. 4 illustrates one embodiment of a system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a digital display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a processor arranged to operate in a plurality of thermal modes including at least a first mode having a first thermal limit and a second mode having a second thermal limit different than the first thermal limit, the plurality of thermal modes comprising a plurality of different maximum temperature limits for the processor wherein each of the plurality of thermal modes comprises a set of pre-determined operating frequencies and power consumption level for the processor; and
thermal management logic operative to select a thermal mode based on one or more operating parameters.

2. The apparatus of claim 1, wherein two or more of the plurality of thermal modes comprise one or more defined thermal, power and performance characteristics.

3. The apparatus of claim 1, wherein two or more of the plurality of thermal modes have different sets of predetermined operating frequencies and power consumption level.

4. The apparatus of claim 1, wherein the first mode comprises a thermal limit down mode having a lower temperature limit than the other modes.

5. The apparatus of claim 1, wherein the second mode comprises a thermal limit up mode having a higher temperature limit than the other modes.

6. The apparatus of claim 1, comprising a third mode having a third thermal limit different than the first and second thermal limits, the third mode comprising a normal thermal limit mode having a higher temperature limit than the first mode and a lower temperature limit than the second mode.

7. The apparatus of claim 1, comprising:
one or more storage devices arranged to store configuration information for two or more of the plurality of thermal modes.

8. The apparatus of claim 7, wherein the configuration information for two or more of the plurality of thermal modes comprises a maximum temperature limit or an operating frequency that are accessible through one or more interfaces.

9. The apparatus of claim 8, wherein the one or more interfaces comprise one or more of a memory-mapped input/output (MMIO) or a platform environment control interface (PECI).

10. The apparatus of claim 1, wherein the thermal management logic is operative to select a thermal mode during a boot sequence of the processor.

11. The apparatus of claim 1, wherein the thermal management logic is operative to dynamically select a thermal mode during operation of the processor.

12. A computer-implemented method, comprising:
selecting a thermal mode for a processor arranged to operate in a plurality of thermal modes including at least a first mode having a first thermal limit and a second mode having a second thermal limit different than the first thermal limit, the plurality of thermal modes comprising a plurality of different maximum temperature limits for the processor wherein each of the plurality of thermal modes comprises a set of pre-determined operating frequencies and power consumption level for the processor;
retrieving configuration information for the selected thermal mode from one or more storage devices; and
operating the processor in the selected thermal mode.

13. The computer-implemented method of claim 12, wherein the configuration information comprises a maximum temperature limit or set of operating frequencies for two or more of the thermal modes.

14. The computer-implemented method of claim 12, wherein the configuration information is retrieved using one or more interfaces.

15. The computer-implemented method of claim 14, wherein the one or more interfaces comprise one or more of a memory-mapped input/output (MMIO) or a platform environment control interface (PECI).

16. The computer-implemented method of claim 12, comprising:
selecting the first mode comprising a thermal limit down mode; and
operating the processor at a lower temperature limit than the other modes.

17. The computer-implemented method of claim 12, comprising:
selecting the second mode comprising a thermal limit up mode; and
operating the processor at a higher temperature limit than the other modes.

18. The computer-implemented method of claim 12, comprising:
selecting a third mode having a third thermal limit different than the first and second thermal limits, the third mode comprising a normal thermal limit mode; and
operating the processor at a higher temperature limit than a temperature limit for the first mode and a lower temperature limit than a temperature limit for the second mode.

19. The computer-implemented method of claim 12, comprising:
selecting a thermal mode during a boot sequence of the processor.

20. The computer-implemented method of claim 12, comprising:
dynamically selecting a thermal mode during operation of the processor.

21. An article comprising a computer-readable storage medium containing instructions that if executed by a processor enable a system to:
select a thermal mode for the processor arranged to operate in a plurality of thermal modes including at least a first mode having a first thermal limit and a second mode having a second thermal limit different than the first thermal limit, the plurality of thermal modes comprising a plurality of different maximum temperature limits for the processor wherein each of the plurality of thermal modes comprises a set of pre-determined operating frequencies and power consumption level for the processor;
retrieve configuration information for the selected thermal mode from one or more storage devices; and
operate the processor in the selected thermal mode.

22. The article of claim 21, wherein the configuration information comprises a maximum temperature limit or set of operating frequencies for two or more of the thermal modes.

23. The article of claim 21, wherein the configuration information is retrieved using one or more interfaces.

24. The article of claim 23, wherein the one or more interfaces comprise one or more of a memory-mapped input/output (MMIO) or a platform environment control interface (PECI).

25. The article of claim 21, comprising instructions that if executed enable the system to:
select the first thermal mode comprising a thermal limit down mode; and
operate the processor at a lower temperature limit than a temperature limit for the other modes.

26. The article of claim 21, comprising instructions that if executed enable the system to
select the second mode comprising a thermal limit up mode; and
operate the processor at a higher temperature limit than a temperature limit for the other modes.

27. The article of claim 21, comprising instructions that if executed enable the system to
select a third mode having a third thermal limit different than the first and second thermal limits, the third mode comprising a normal thermal limit mode; and
operate the processor at a higher temperature limit than a temperature limit for the first mode and a lower temperature limit than a temperature limit for the second mode.

28. The article of claim 21, comprising instructions that if executed enable the system to
select a thermal mode during a boot sequence of the processor or dynamically select a thermal mode during operation of the processor.

29. A system, comprising:
a processor arranged to operate in a plurality of thermal modes comprising at least a first mode having a first thermal limit, a second mode having a second thermal limit and a third mode having a third thermal limit, wherein each of the thermal limits are different, the plurality of thermal modes comprising a plurality of different maximum temperature limits for the processor wherein each of the plurality of thermal modes comprises a set of pre-determined operating frequencies and power consumption level for the processor;
one or more storage devices coupled to the processor and arranged to store configuration information for the plurality of thermal modes;
thermal management logic operative to select a thermal mode based on one or more properties of the system.

30. The system of claim 29, comprising:
a digital display.

31. The system of claim 29, comprising:
one or more sensors operative to sense a temperature of the processor.

32. The system of claim 29, wherein the thermal management logic is operative to:
select the first mode and operate the processor at a lower temperature limit than a temperature limit for the second and third modes;
select the second mode and operate the processor at a higher temperature limit than a temperature limit for the first and third modes; or
select the third mode and operate the processor at a higher temperature limit than a temperature limit for first mode and a lower temperature limit than a temperature limit for the second mode.

* * * * *